(12) United States Patent
Wang et al.

(10) Patent No.: US 9,809,708 B2
(45) Date of Patent: Nov. 7, 2017

(54) CURABLE SILICONE COMPOSITION

(71) Applicant: 3M INNOVATIVE PROPERTIES COMPANY, St. Paul, MN (US)

(72) Inventors: Yaming Wang, Shanghai (CN); Wei Zhou, Shanghai (CN); Wei Cui, Shanghai (CN); Qing Wu, Shanghai (CN); Zhou Jin, Shanghai (CN); Zheng Guan, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/303,885

(22) PCT Filed: Apr. 15, 2014

(86) PCT No.: PCT/CN2014/075414
§ 371 (c)(1),
(2) Date: Oct. 13, 2016

(87) PCT Pub. No.: WO2015/157914
PCT Pub. Date: Oct. 22, 2015

(65) Prior Publication Data
US 2017/0029623 A1 Feb. 2, 2017

(51) Int. Cl.
| | | |
|---|---|---|
| *C08K 3/10* | (2006.01) | |
| *C08L 83/04* | (2006.01) | |
| *C08L 7/00* | (2006.01) | |
| *C08L 9/00* | (2006.01) | |
| *C08L 11/00* | (2006.01) | |
| *C08L 9/02* | (2006.01) | |
| *C08G 77/16* | (2006.01) | |

(52) U.S. Cl.
CPC .............. *C08L 83/04* (2013.01); *C08L 7/00* (2013.01); *C08L 9/00* (2013.01); *C08L 9/02* (2013.01); *C08L 11/00* (2013.01); *C08G 77/16* (2013.01); *C08L 2201/08* (2013.01)

(58) Field of Classification Search
CPC .... C08L 83/04; C08L 9/00; C08L 9/02; C08L 2201/08
USPC ......................................................... 524/409
See application file for complete search history.

(56) References Cited

U.S. PATENT DOCUMENTS

| | | | |
|---|---|---|---|
| 5,412,324 A | 5/1995 | Goldman | |
| 6,548,763 B2 * | 4/2003 | Kaltenborn | H01B 3/30 174/137 B |
| 7,232,609 B2 | 6/2007 | Ahmed | |
| 7,553,901 B2 | 6/2009 | Horikoshi | |
| 2007/0237912 A1 | 10/2007 | Correia | |

FOREIGN PATENT DOCUMENTS

| | | |
|---|---|---|
| CN | 101570680 | 11/2009 |
| CN | 101724377 | 6/2010 |
| DE | 102504547 | 6/2012 |
| JP | 2003-155398 | 5/2003 |

OTHER PUBLICATIONS

ASTM D 2196-99, Standard Test Methods for Rheological Properties of Non-Newtonian Materials by Rotational (Brookfield type) Viscometer, ASTM Int'l, West Conshohocken, PA, USA (1999), 5 pp.
International Search Report for PCT International Application No. PCT/CN2014/075414, dated Jan. 8, 2015, 4pgs.

* cited by examiner

*Primary Examiner* — Hui Chin
(74) *Attorney, Agent, or Firm* — Janet A. Kling

(57) ABSTRACT

This invention provides a curable composition, which comprises a RTV silicone and an uncrosslinked or partially crosslinked rubber and/or elastomer providing initial strength to the composition, wherein the ratio of the silicone to the rubber and/or elastomer ranges from 1:2 to 15:1 by weight. The curable composition has improved handling and application properties in addition to good thermal conductive performance, UV and thermal aging performance, electrical insulation performance, and adhesive performance.

19 Claims, No Drawings

CURABLE SILICONE COMPOSITION

TECHNICAL FIELD

This invention relates to a room temperature vulcanizable (RTV) silicone composition. Particularly, the present invention relates to a RTV silicone composition for applications in insulation protection of electric and electronic elements or devices. The present invention also relates to an article obtained or obtainable from the silicone composition, and a method for preparing the composition.

BACKGROUND ART

In electrical market, there are huge number of electric and electronic elements such as tension clamps, busbar connections and antenna, which need to be protected with a material having properties including insulation, heating aging resistance, UV aging resistance, and adhesion strength.

U.S. Pat. No. 5,412,324A discloses an insulating coating on the electric bus bar, which could withstand long term outdoor exposure. The insulating coating may be made by polymers such as polyvinyl chloride, mylar and epoxy, particularly epoxy resin.

U.S. Pat. No. 6,548,763B2 discloses a liquid or pastelike casting composition based on a polymeric matrix resin. The casting composition includes in uniform distribution a selected hydrophobicizing or water-repelling compound or a mixture of such compounds in encapsulated form.

U.S. Pat. No. 7,232,609B2 discloses a polymer-based high voltage insulator having a monolithic protective coating of a one-part RTV organopolysiloxane rubber composition comprising a major part of a polydiorganosiloxane fluid having a low viscosity.

U.S. Pat. No. 7,553,901B2 discloses a RTV silicone composition comprising an organopolysiloxane having a low viscosity, an organosilicon compound or partial hydrolytic condensate, and a non-aromatic amino-bearing compound for protection of electric and electronic parts, which can prevent or retard the parts encapsulated or sealed therewith from corrosion with sulfur-containing gas.

Typically, silicone coating has lower reactivity, and lower toxicity as compared to the coating of epoxy resin. Conventionally used silicones are either HTV rubbers which are cured and inactive before they are applied onto a surface, or RTV rubbers which are active until they are applied onto a surface and which are typically in a liquid state.

As it is known, RTV silicone with low viscosity, which is conventionally used in forming a liquid preparation, is not suitable to be applied onto the joints or the parts with special shape such as sharp profile because of the introducing of bubbles during coating process, which will influence its insulation performance.

SUMMARY OF THE INVENTION

In one aspect, the present invention aims at providing a curable composition with properties including at least one of the improvements on operation and application, thermal conductivity, electrical insulation, UV and thermal aging resistance, and good adhesive strength with substrates such as metals, semiconductors and woods. Preferably, the shape of the curable composition may be changed according to need, with good enough strength and excellent self-fusion performance.

Accordingly, the present invention provides a curable composition prepared from a room temperature vulcanizable (RTV) silicone with a viscosity of more than 10,000 cps and an uncrosslinked or partially crosslinked rubber and/or elastomer providing initial strength. The curable composition may be formed as a formulation having both tape-like and plasticine-like application properties.

In one aspect of the invention, a curable composition is provided comprising a RTV silicone and an uncrosslinked or partially crosslinked rubber and/or elastomer providing initial strength to the composition, wherein the ratio of the silicone to the rubber and/or elastomer ranges from 1:2 to 15:1 by weight, preferably ranges from 1:1.5 to 10:1 by weight, preferably ranges from 1:1 to 5:1 by weight, more preferably ranges from 1.5:1 to 3:1 by weight. For example, the ratio of the silicone to the rubber and/or elastomer is 2:1 by weight.

Preferably, the RTV silicone has a Mn of from 10,000 g/mol to 3,000,000 g/mol, preferably from 100,000 g/mol to 2,000,000 g/mol, more preferably from 500,000 g/mol to 2,000,000 g/mol. For example, the RTV silicone has a Mn of 1,000,000 g/mol. "Mn" refers to the "number average molecular weight".

Preferably, the RTV silicone has a viscosity of at least 10,000 cps, preferably from 10,000 cps to 2,000,000 cps, more preferably from 100,000 cps to 1,500,000 cps, even more preferably from 300,000 cps to 1,000,000 cps. For example, the RTV silicone has a viscosity of 400,000 cps or 800,000 cps. The viscosity of the RTV silicone is determined according to ASTM D 2196-1999, by rotational (Brookfield) Viscometer.

Preferably, the rubber and/or elastomer has a Mooney viscosity (ML1+4) of at least 10 at 100° C., preferably in the range of 20 to 200 at 100° C., preferably in the range of 40 to 150 at 100° C., more preferably in the range of 50 to 100 at 100° C.

Preferably, the rubber and/or elastomer comprises at least one selected from the group consisting of butyl rubber, fluoroelastomer (FKM), hydrogenated nitrile rubber (HNBR), ethylene propylene diene rubber (EPDM), and the combination thereof.

Preferably, the curable composition has a Mooney viscosity (ML1+4) in a range of 3 to 100 at 100° C., preferably in the range of 4 to 60 at 100° C., preferably in the range of 8 to 50 at 100° C., more preferably in the range of 15 to 40 at 100° C. For example, the curable composition has a Mooney viscosity (ML1+4) of 20 at 100° C.

In an embodiment, the curable composition according to the present invention further comprises at least one component selected from the group comprising a crosslinker, a catalyst, a co-crosslinker, a reinforcing material, an adhesive promoter, a pigment, a toner, a fire retardant, a surface modifier, a thickener, a rheology modifier, and the combination thereof.

In still another aspect of the invention, a method for preparing the curable composition according to the invention is provided, which comprises blending a RTV silicone with an uncrosslinked or partially crosslinked rubber and/or elastomer in a ratio of 1:2 to 15:1 by weight, preferably ranges from 1:1.5 to 10:1 by weight, preferably ranges from 1:1 to 5:1 by weight, more preferably ranges from 1.5:1 to 3:1 by weight.

In another aspect of the invention, an article obtained or obtainable from the curable composition according to the present invention is provided.

In another aspect of the invention, a device comprising the composition according to the present invention which has been subjected to curing is provided.

In still another aspect of the invention, a method of using the article according to the invention is provided, which comprises applying the article onto a surface to be protected and exposing the article to moisture so as to cure the article under moisture.

These and other features, aspects, and advantages of the present invention will become better understood with reference to the following description and appended claims.

DETAILED DESCRIPTION OF THE INVENTION

Hereinafter, embodiments of the present invention will be described in more details.

In an embodiment, the present invention provides a curable composition comprising a room temperature vulcanizable (RTV) silicone and an uncrosslinked or partially crosslinked rubber and/or elastomer providing initial strength to the composition, wherein the ratio of the silicone to the rubber and/or elastomer ranges from 1:2 to 15:1 by weight.

The RTV silicone as used herein is not particularly limited, as long as the RTV silicone is active and can be crosslinked at environmental temperature by reacting with moisture. For example, the RTV silicone may comprises at least one of a hydroxyl-terminated silicone of formula (I) or an alkoxy-terminated silicone comprising a moiety of formula (II)

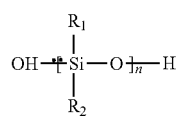
(I)

wherein $R_1$ and $R_2$ are independently selected from the group consisting of H, substituted or unsubstituted C1-12 alkyl, C2-12 alkenyl, C2-12 alkynyl, C1-12 alkoxyl, and C6-12 aryl; and n is an integer of from 1,000 to 3,000,000, preferably from 100,000 to 2,000,000, more preferably from 500,000 to 2,000,000.

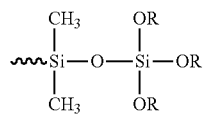
(II)

wherein each R is independently selected from the group consisting of substituted or unsubstituted C1-12 alkyl, particularly C1-10 alkyl, more particularly C1-6 alkyl, even more particularly methyl or ethyl.

As mentioned above, the RTV silicone can be crosslinked and cured at environmental temperature with the moisture existed in atmosphere. Generally the rate of curing depends on the environmental temperature and humidity, and the presence of crosslinker and/or catalyst. For example, the crosslinking reaction mechanism of hydroxyl-terminated RTV silicone is generally as below:

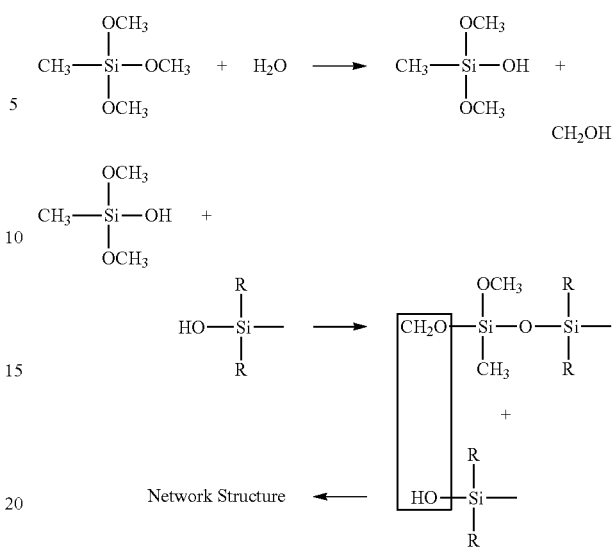

There are several different types of crosslinking reaction, such as Ketonic type, Oxime type and alcohol type.

Preferably, the RTV silicone comprises at least one selected from the group consisting of hydroxyl silicone, methoxy silicone, ethoxy silicone, and the combination thereof.

The RTV silicone may have a Mn of from 10,000 g/mol to 3,000,000 g/mol, preferably from 100,000 g/mol to 2,000,000 g/mol, more preferably from 500,000 g/mol to 2,000,000 g/mol. The molecular weight of RTV silicone should be selected to exhibit a high viscosity. Accordingly, the RTV silicone has a viscosity of 10,000 cps or more, preferably from 10,000 cps to 2,000,000 cps, more preferably from 100,000 cps to 1,500,000 cps, even more preferably from 300,000 cps to 1,000,000 cps. For example, the RTV silicone comprises a hydroxy-terminated polydimethylsiloxane with a viscosity of 500,000 cps.

The uncrosslinked or partially crosslinked rubber and/or elastomer impart initial strength to the curable composition. Upon the curing of the composition, the rubber and/or elastomer is dispersed throughout the crosslinked silicone network, forming a uniform interpenetrating polymer network. It is also possible the rubber and/or elastomer is dispersed into the crosslinked silicone network with continuous linear structure.

In addition, the rubber and/or elastomer do not deteriorate the adhesive strength of the composition to a surface of substrates or structures such as those made by metals. The rubber or elastomer may be blended with the RTV silicone to yield a substantially uniform curable composition without phase separation. Preferably the rubber or elastomer is heat-resistance and aging-resistance.

In the context, "partially crosslinked rubber" refers to a rubber which is not fully crosslinked, preferably having a degree of crosslinking of not more than 90%, more preferably having a degree of crosslinking of not more than 75%, and most preferably having a degree of cross linking of not more than 50%.

The rubber and/or elastomer may have a Mooney viscosity (ML1+4) of at least 10 at 100° C., preferably in the range of 20 to 200 at 100° C., preferably in the range of 40 to 150 at 100° C., more preferably in the range of 50 to 100 at 100° C. For example, the rubber and/or elastomer have a Mooney viscosity of 50 at 100° C. Mooney viscosity is a measurement of the deformability of a material, especially of a rubber. A low Mooney viscosity indicates a high deformability, and vice versa. The Mooney viscosity of the rubber and/or elastomer may be selected such that the curable composition is ready to self-fuse and also has sufficient initial strength. Thus, the curable composition would have sufficient flexibility for being applied onto a special-shaped metal structure.

The uncrosslinked or partially crosslinked rubber and/or elastomer comprises at least one selected from the group consisting of butyl rubber, fluoroelastomer (FKM), ethylene propylene diene rubber (EPDM), ethylene propylene rubber (EPR), nitrile rubber (NBR), hydrogenated nitrile rubber (HNBR), acrylate rubber (ACM), polyurethane rubber (PUR), nature rubber (NR), styrene butadiene rubber (SBR), polychloroprene rubber (CR), polybutadiene rubber (BR), polyisoprene rubber (IR), chlorosulfonated polyethylene (CSM), polysulfide rubber (PSR), and chlorohydrin rubber (CO). Preferably, the rubber and/or elastomer comprises at least one selected from the group consisting of butyl rubber, fluoroelastomer (FKM), hydrogenated nitrile rubber (HNBR), and ethylene propylene diene rubber (EPDM).

Preferably, the rubber and/or elastomer is selected to impart additional benefits such as advantageous fire retardance performance, thermal conductive performance, UV aging and thermal aging performance, and electrical insulation performance. For example, uncrosslinked or partially crosslinked butyl rubber is preferable used in the present invention in view of the electrical insulation, thermal conductivity, adhesive strength and the cost.

The curable composition may be in the form of tape-like or plasticine-like. In the sense of the strength and the adhesive performance, the curable composition has a Mooney viscosity (ML1+4) in a range of 3 to 100 at 100° C., preferably in the range of 4 to 60 at 100° C., more preferably in the range of 8 to 40 at 100° C. Mooney viscosity may be measured in a common manner in the art.

In the context, "plasticine-like" refers to a composition or an article which can be kneaded into any shape without being sticky, and "tape-like" refers to a plasticine-like composition or article which has certain strength such that it can be enwound on a substrate likes a tape.

The curable composition may further comprises at least one component selected from the group consisting of a crosslinker, a catalyst, a co-crosslinker, a reinforcing material, an adhesive promoter, a pigment, a toner, a fire retardant, a surface modifier, a thickener, a rheology modifier, and the combination thereof.

In particular, a crosslinker, a catalyst, and an optional co-crosslinker are added into the composition in an amount such that the RTV silicone forms a network structure within a short time upon exposure to moisture. Preferably, the crosslinking rate of the composition is controllable by selecting the species of crosslinker and catalyst and the amount thereof to an extent which allows sufficient time for an operator to apply the composition.

The crosslinker may comprise at least one selected from the group consisting of an alkoxy functional curing agent, an acetoxy functional curing agent, an oximino functional curing agent, a keto functional curing agent, and the combination thereof. Preferably, the crosslinker comprises at least one selected from the group consisting of methyltriacetoxysilane, methyltrimethoxysilane, methyl tri(isopropenyloxy) silane, methyltrimethylethylketoximesilane, vinyltrimethoxysilane, vinyltriethoxysilane, γ-(methacryloxy) propyltrimethoxysilane, aminopropyltriethoxysilane, N-(β-aminoethyl)-γ-aminopropyltrimethoxysilane, γ-(2,3-epoxypropoxy)propyltrimethoxysilane, γ-mercaptopropyltriethoxysilane, γ-mercaptopropyltrimethoxysilane, methyltriethoxysilane, tetramethoxysilane, tetrapropoxysilane, tetraethoxysilane, and ethyltriacetoxysilane.

More preferably, the crosslinker comprises at least one alkoxy silane, such as methyltrimethoxysilane and methyltriethoxysilane. The alkoxy silane crosslinkers advantageously allow for a moderate crosslinking rate of the composition which on one hand allows the composition to be cured in a short time, and on the other hand, is not too quick for the composition to be applied by an operator.

The crosslinker may be added into the composition in an amount of from 0.1% to 20% by weight, preferably from 1% to 10% by weight, more preferably from 3% to 8% by weight, based on the amount of RTV silicone.

Cure catalysts include alkyltin ester compounds such as dibutyltin diacetate, dibutyltin dilaurate, and dibutyltin dioctoate; titanates and titanium chelates such as tetraisopropoxytitanium, tetra-n-butoxytitanium, tetrakis(2-ethylhexoxy)titanium, dipropoxybis(acetylacetonato)titanium, and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate, and alkoxyaluminum compounds; quaternary ammonium salts such as benzyltriethylammonium acetate; alkali metal salts of lower fatty acids such as potassium acetate, sodium acetate and lithium oxalate; guanidyl-containing silanes or siloxanes such as tetramethylguanidylpropyltrimethoxysilane, tetramethylguanidylpropylmethyldimethoxysilane, tetramethylguanidylpropyltris(trimethylsiloxy)silane, (tetramethylguanidino) propyl triethoxysilane and mixtures comprising one or more of the foregoing. More preferably, the catalyst comprises at least one selected from the group consisting of titanium complex, tin salt such as dibutyltin diacetate, dibutyltin dilauryl, tin 2-ethyl hexanoate and the combination thereof.

Among them, titanium complex is preferably used as the catalyst in the present composition because it is found that titanium complex can be combined with the alkoxy silane crosslinker and allow for a moderate crosslinking rate of the composition.

The catalyst, especially titanium complex may be added into the composition in an amount of from 0.5% to 10% by weight, preferably from 1% to 8% by weight, more preferably from 2% to 6% by weight, based on the amount of RTV silicone.

The reinforcing material may be compounded such that the composition has improved strength before and after curing. Furthermore, the reinforcing material may increase the viscosity of the composition. Suitable reinforcing fillers include finely divided silica, fumed silica, silica aerogel, precipitated silica, diatomaceous earth, metal oxides such as iron oxide, titanium oxide, and aluminum oxide, metal nitrides such as boron nitride and aluminum nitride, metal carbonates such as calcium carbonate, magnesium carbonate and zinc carbonate, asbestos, glass wool, powdered mica, powdered fused silica, powdered synthetic resins such as polystyrene, polyvinyl chloride, and polypropylene, and the like.

These reinforcing fillers may be added in any desired amount that does not adversely affect the property of the composition. For example, the reinforcing fillers are added into the composition in an amount of from 10% to 300% by weight, preferably from 30% to 240% by weight, more preferably from 60% to 180% by weight, based on the amount of RTV silicone.

Preferably the fillers are previously dried to remove water prior to use. In an embodiment, the reinforcing material comprises at least one selected from the group consisting of fumed silica, $CaCO_3$, titanium oxide, mica and the combination thereof.

Other additives, such as an adhesive promoter, a pigment, a toner, a fire retardant, a surface modifier, a thickener, a rheology modifier, may be added into the present composition. In an embodiment, the composition comprises at least one additive selected from the group consisting of γ-(2,3-epoxypropoxy) propyl trimethoxysilane, carbon black, DecaBDE, antimony trioxide, and the combination thereof.

The curable composition may be prepared by a method which comprises steps of blending a RTV silicone, an uncrosslinked or partially crosslinked rubber and/or elastomer to form a mixture, wherein a ratio of the RTV silicone to the rubber and/or elastomer is in a range of 1:2 to 15:1 by weight, preferably ranges from 1:1.5 to 10:1 by weight, preferably ranges from 1:1 to 5:1 by weight, more preferably ranges from 1.5:1 to 3:1 by weight. The blending step may further comprise adding at least one component selected from a group consisting of a crosslinker, a catalyst, a co-crosslinker, a reinforcing material, an adhesive promoter, a pigment, a toner, a fire retardant, a surface modifier, a thickener, a rheology modifier, and the combination thereof, and blending the mixture thus formed uniformly. The method may comprise a further step of molding the mixture into a desired shape. Preferably, the blending step may be implemented under vacuum condition.

Alternatively, an uncrosslinked or partially crosslinked rubber such as butyl rubber is blended with components other than active catalyst and crosslinker to form a first composite. The RTV silicone, reinforcing materials and optional components other than active catalyst and crosslinker are blended with the first composite to form a second composite. And then the active components such as catalyst, crosslinker, and adhesive promoter are dispersed into the second composite to form the curable composition. The blending or dispersing can be conducted by a conventional kneader or mixer.

The curable composition may be molded or shaped into an article in the form of a pad, a plate, a sheet, a film, a rod, a tape, a paste or plasticine based upon the manner of application. A kneader, extruder or calender conventionally used in the art may be used in the preparation of the article. For example, a sheet article is obtained by a method including subjecting the composition according to the present invention to extruding or calendering. The article can be put into a waterproof or vacuum package so as to form a packaged kit which is adapted to storage for long term.

It should be noted that occasional or minor curing may take place during preparation, formation, storage, delivery of the curable composition or article. That is, the curable composition or article of the invention comprises partly cured forms of composition which is substantially curable under the environment.

The curable composition or article may be applied onto a surface of substrate such as the electric inductive substrate made by metals. In particular, the curable composition or article is especially applied onto a special-shaped structure in an electric or electronic element such as a tension clamp, a busbar connection or an antenna. And then the composition or article is subject to cure under ambient environment with moisture and a product with a cured layer or joint is obtained.

Hereinafter, the present invention will be understood and appreciated more fully from the following examples, and the examples are for illustrating the present invention and not for limiting the present invention.

EXAMPLES

Unless otherwise indicated, the amount of each component is in a weight part basis.

Raw Materials

The raw materials used in the examples were listed in Table 1 below.

TABLE 1

The raw materials used in the examples

| raw materials | chemical name | basic function | Vendor |
| --- | --- | --- | --- |
| 107 silicone | hydroxyl silicone | Polymer base | JiangSu Hongda industrial Co. |
| Uncrosslinked IIR | uncrosslinked butyl rubber | polymer base | LANXESS |
| NBR | nitrile butadiene rubber | polymer base | LANXESS |
| FKM | fluoroelastomer | polymer base | LANXESS |
| Aerosil 8200 | hydrophobic fumed silica | reinforcing materials | Evonik Degussa Specialty Chemicals (shanghai)Co.Ltd |
| D62 | Titanium complex | catalyst | Hubei Xinlantian Industry Co. |
| D80 | Dibutyltin diacetate | catalyst | Hubei Xinlantian Industry Co. |
| D10 | Methyltriacetoxysilane | crosslinker | Hubei Xinlantian Industry Co. |
| D20 | methyltrimethoxysilane | crosslinker | Hubei Xinlantian Industry Co. |
| D30 | Methyltrimethylethylketoximesilane | crosslinker | Hubei Xinlantian Industry Co. |

TABLE 1-continued

The raw materials used in the examples

| raw materials | chemical name | basic function | Vendor |
| --- | --- | --- | --- |
| C1 | Methyl tri (isopropenyloxy) silane | crosslinker | Momentive performance material |
| C2 | (tetramethylguanidino) propyl triethoxy silane | catalyst | Jiangsu HSC Corporation |
| KH560 | γ-(2,3-epoxypropoxy)propyl trimethoxysilane | adhesive promoter | Hubei Xinlantian Industry Co. |
| N550 | Carbon black | toner | Cabot Chemical Co., Ltd |
| F1 | DecaBDE and antimony trioxide(1:1 by weight) | fire retardant | Guangzhou Liben Materials Co. |
| Calcium Carbonate | $CaCO_3$ | Reinforcing materials and surface modifier | Kunshan Jinkaidi Chemical Co. |

Preparation and Tests

Preparation of Mixture A: Selection and Evaluation of Silicones with Different Viscosity A 107 silicone, a reinforcing material Aerosil 8200, a fire retardant F1, and $CaCO_3$ serving as both a reinforcing material and a surface modifier were blended in an amount as showed in table 2 to form a uniform mixture A in a kneader. Mixtures A1-A7 represent the mixture A in which 107 silicones have different viscosity.

Preparation of Mixture B

Mixture B comprising an uncrosslinked rubber or elastomer like butyl rubber were prepared, which can be blended with mixture A.

A toner carbon black N550 and an additional part of fire retardant F1 were dispersed into uncrosslinked butyl rubber, NBR and FKM in an amount as showed in table 3 respectively by a kneader under vacuum conditions to from a uniform mixture B. Mixtures B1-B3 represent the mixture B having different amount of above compositions.

TABLE 2

Basic formulation of mixture A

| | 107 silicone with different viscosity | | | | | | | Aerosil 8200 | F1 | $CaCO_3$ |
| --- | --- | --- | --- | --- | --- | --- | --- | --- | --- | --- |
| | 5,000 cps | 10,000 cps | 50,000 cps | 100,000 cps | 400,000 cps | 800,000 cps | 1,000,000 cps | | | |
| A 1 | 100 | | | | | | | 20 | 40 | 80 |
| A 2 | | 100 | | | | | | 20 | 40 | 80 |
| A 3 | | | 100 | | | | | 20 | 40 | 80 |
| A 4 | | | | 100 | | | | 20 | 40 | 80 |
| A 5 | | | | | 100 | | | 20 | 40 | 80 |
| A 6 | | | | | | 100 | | 20 | 40 | 80 |
| A 7 | | | | | | | 100 | 20 | 40 | 80 |

Mixtures A 1-A7 were evaluated on the plasticine-like performance. In particular, a mixture was graded as plasticine-like in the case that it can be kneaded into any shape without being sticky. According to the evaluation, a silicone having a viscosity of 10,000 cps or more was useful for forming a plasticine-like composite (mixture A2 to A7), while a silicone having a viscosity of 5,000 cps would not readily yield a desirable plasticine-like composite (mixture A1).

The reinforcing materials such as fumed silica and $CaCO_3$ could increase the viscosity and helped to form a plasticine-like composite.

However, despite that a silicone having increased viscosity and reinforcing materials such as fumed silica and $CaCO_3$ were employed, it is hard to form a tape-like composite which facilitate operation more than plasticine-like composite.

TABLE 3

Basic formulation of mixture B

| | butyl rubber | NBR | FKM | F1 | N550 |
| --- | --- | --- | --- | --- | --- |
| B1 | 100 | | | 60 | 10 |
| B2 | | 100 | | 60 | 10 |
| B3 | | | 100 | 60 | 10 |

The mixture B comprising these rubbers or elastomers would be employed in the following examples to provide initial strength when blended with a mixture A.

Preparation of Pad Samples 1-15: Selection and Evaluation of Mixture B in Different Amount Mixtures A (A2, A5, or A7) were blended with mixture B1 comprising butyl rubber in an amount as showed in table 4, and crosslinker D20, catalyst D62, and adhesive promoter KH560 were added in an amount of 6%, 3%, and 1% respectively based on the weight of 107 silicone, to obtain the curable composition by a kneader. The curable composition can be then molded into a desired shape of pad to match different application. In the examples, the curable composition was molded into pads, such that samples 1-15 were obtained.

Tape-like performances of the pad samples were evaluated by enwinding the flexible pads on a substrate made by copper, in which a sample was graded as tape-like in the case that it was plasticine-like and had certain strength such that can be enwound on a substrate like a tape.

Self-fusion performances of the samples were evaluated by kneading, in which a sample is graded as self-fusible in the case that it fuses without marks visible to the naked eye when kneaded.

Adhesive strengths of the samples with a copper substrate were measured according to GB/T 2790-1995 at a condition: 180° peel, 1 inch width, 50 mm/s.

TABLE 4

Pad samples and related performances

| | Blending ratio (weight part) | | | | performances | | | |
| --- | --- | --- | --- | --- | --- | --- | --- | --- |
| | | | | | plasti-cine-like | tape-like | Self fusion | Adhesion with copper $N \cdot cm^{-1}$ |
| | A 2 | A 5 | A 7 | B 1 | | | | |
| sample 1 | 80 | | | 20 | yes | no | yes | >30, pad break |
| sample 2 | 70 | | | 30 | yes | yes | yes | >30, pad break |
| sample 3 | 55 | | | 45 | yes | yes | yes | >30, pad break |
| sample 4 | | 85 | | 15 | yes | no | yes | >30, pad break |
| sample 5 | | 70 | | 30 | yes | yes | yes | >30, pad break |
| sample 6 | | 60 | | 40 | yes | yes | yes | >30, pad break |
| sample 7 | | | 90 | 10 | yes | yes | yes | >30, pad break |
| sample 8 | | | 80 | 20 | yes | yes | yes | >30, pad break |
| sample 9 | | | 60 | 40 | yes | yes | yes | >30, pad break |
| sample 10 | 85 | | | 15 | yes | no | yes | >30, pad break |
| sample 11 | | 90 | | 10 | yes | no | yes | >30, pad break |
| sample 12 | | | 95 | 5 | yes | no | yes | >30, pad break |
| sample 13 | 45 | | | 55 | yes | yes | no | >30, pad break |
| sample 14 | | 50 | | 50 | yes | yes | no | >30, pad break |
| sample 15 | | | 55 | 45 | yes | yes | no | >30, pad break |

From table 4, it can be seen that an amount of mixture B helped to form a pad sample with good tape-like and self-fusion performance. It was observed that the amount range of mixture B was related with the viscosity of silicone as used in mixture A.

Preparation of Pad Samples 16-39: Selection and Evaluation of Reinforcing Materials in Different Amount Samples 16-39 were obtained according to the same procedure as for the above samples 2, 5, and 8 except that different amounts of reinforcing materials such as $CaCO_3$ and fumed silica Aerosil 8200 were used as showed in table 5.

Plasticine-like, tape-like, and self-fusion performances, and adhesive strengths with a copper substrate of the samples were evaluated according to same methods as described above for samples 1-15.

TABLE 5

Formulation and performances of pad samples with different amount of $CaCO_3$ and fumed silica

| | silicone with different viscosity | | | Raw material or mixture | | | | performance | | | |
| | | | | | | | | plasti- | | | Adhesion |
| | 10,000 cps | 100,000 cps | 1,000,000 cps | Aerosil 8200 | F1 | $CaCO_3$ | Ratio of Mixture B1 | cine-like | tape-like | Self fusion | with copper $N \cdot cm^{-1}$ |
|---|---|---|---|---|---|---|---|---|---|---|---|
| sample 2 | 100 | | | 20 | 40 | 80 | 3:7 | yes | yes | yes | >30, pad break |
| sample 16 | 100 | | | 20 | 40 | 10 | 3:7 | no | no | yes | >30, pad break |
| sample 17 | 100 | | | 20 | 40 | 40 | 3:7 | no | no | yes | >30, pad break |
| sample 18 | 100 | | | 20 | 40 | 200 | 3:7 | yes | yes | yes | >30, pad break |
| sample 19 | 100 | | | 20 | 40 | 220 | 3:7 | yes | yes | no | 20 |
| sample 20 | 100 | | | 2 | 40 | 80 | 3:7 | yes | no | yes | >30, pad break |
| sample 21 | 100 | | | 15 | 40 | 80 | 3:7 | yes | yes | yes | >30, pad break |
| sample 22 | 100 | | | 40 | 40 | 80 | 3:7 | yes | yes | yes | >30, pad break |
| sample 23 | 100 | | | 60 | 40 | 80 | 3:7 | yes | yes | yes | >30, pad break |
| sample 5 | | 100 | | 20 | 40 | 80 | 3:7 | yes | yes | yes | >30, pad break |
| sample 24 | | 100 | | 20 | 40 | 10 | 3:7 | no | no | yes | >30, pad break |
| sample 25 | | 100 | | 20 | 40 | 40 | 3:7 | yes | yes | yes | >30, pad break |
| sample 26 | | 100 | | 20 | 40 | 180 | 3:7 | yes | yes | yes | >30, pad break |
| sample 27 | | 100 | | 20 | 40 | 210 | 3:7 | yes | yes | no | 18 |
| sample 28 | | 100 | | 30 | 40 | 80 | 3:7 | yes | yes | yes | >30, pad break |
| sample 29 | | 100 | | 10 | 40 | 80 | 3:7 | yes | no | yes | >30, pad break |
| sample 30 | | 100 | | 40 | 40 | 80 | 3:7 | yes | yes | yes | >30, pad break |
| sample 31 | | 100 | | 60 | 40 | 80 | 3:7 | yes | yes | no | 25 |
| sample 8 | | | 100 | 20 | 40 | 80 | 2:8 | yes | yes | yes | >30, pad break |
| sample 32 | | | 100 | 20 | 40 | 10 | 2:8 | no | no | yes | >30, pad break |
| sample 33 | | | 100 | 20 | 40 | 40 | 2:8 | yes | yes | yes | >30, pad break |
| sample 34 | | | 100 | 20 | 40 | 160 | 2:8 | yes | yes | yes | >30, pad break |
| sample 35 | | | 100 | 20 | 40 | 200 | 2:8 | yes | yes | no | >30, pad break |
| sample 36 | | | 100 | 30 | 40 | 80 | 2:8 | yes | yes | yes | >30, pad break |
| sample 37 | | | 100 | 5 | 40 | 80 | 2:8 | yes | no | yes | >30, pad break |
| sample 38 | | | 100 | 40 | 40 | 80 | 2:8 | yes | yes | yes | >30, pad break |
| sample 39 | | | 100 | 60 | 40 | 80 | 2:8 | yes | yes | no | 22 |

In Table 5, the item "ratio of Mixture B1" refers to the ratio of amount of Mixture B1 to amount of silicone together with fumed silica, F1 and CaCO₃ was fixed on 3:7 by weight in Samples 2, 16 to 23, 5, 24 to 31, and the ratio was fixed on 2:8 by weight in Samples 8, 32 to 39, respectively.

Table 5 shows the performance of the pad samples with different amount of CaCO₃ and fumed silica. It can be seen that an amount of reinforcing materials such as CaCO₃ and fumed silica helped to form a pad with good tape-like and self-fusion performance. It is observed that the amount of reinforcing materials was related with the viscosity of silicone and the amount of mixture B1.

From table 5, it can be seen that reinforcing materials can be used as a further material to improve the initial strength of the curable pad.

Preparation and Evaluation of Pad Samples 40-45

Mixture A7 comprising a silicone having a viscosity of 1,000,000 cps was blended with mixtures B2 or B3 in an amount as showed in table 6, and crosslinker D20, catalyst D62, and adhesive promoter KH560 were added in an amount of 6%, 3%, and 1% respectively based on the weight of the silicone to obtain a uniform blend by a kneader. The blend was then molded into a desired shape of pad.

Plasticine-like, tape-like, and self-fusion performances, and adhesive strengths with a copper substrate of the samples were evaluated according to same methods as described above for samples 1-15.

TABLE 6

Formulation and performances of RTV/FKM, RTV/NBR based pads

| | A 7 | B 2 | B 3 | plasticine-like | tape-like | Self fusion | Adhesion with copper N · cm⁻¹ |
|---|---|---|---|---|---|---|---|
| sample 40 | 80 | 20 | | yes | yes | yes | >30, pad break |
| sample 41 | 70 | 30 | | yes | yes | yes | >30, pad break |
| sample 42 | 55 | 45 | | yes | yes | yes | >30, pad break |
| sample 43 | 80 | | 20 | yes | yes | yes | >30, pad break |
| sample 44 | 70 | | 30 | yes | yes | yes | >30, pad break |
| sample 45 | 55 | | 45 | yes | yes | yes | >30, pad break |

Table 6 shows the performances of RTV/FKM, RTV/NBR based pads, from which it can be seen that the RTV silicone can be blended with other rubbers or elastomers than butyl rubber and achieve comparable results.

Preparation and Evaluation of Pad Samples 46-57 with Different Crosslinkers and Catalysts Mixture A7 comprising a silicone having a viscosity of 1,000,000 cps was blended with mixture B1 comprising butyl rubber, and different crosslinkers (D10, D20, D30, or C1) and catalysts (D62, D80, or C2), along with adhesive promoter KH560 were added in an amount as showed in table 7 to obtain a uniform blend by a kneader. The blend was then molded into a desired shape of pad. In table 7, mixture B1 comprising butyl rubber was blended with the mixture A7 in a ratio of 3:7 by weight.

TABLE 7

Formulation of pads with different crosslinkers and catalysts

| | A 7 | D10 | D20 | D30 | C1 | D62 | D80 | C2 | KH560 |
|---|---|---|---|---|---|---|---|---|---|
| sample 46 | 100 | 1 | | | | 0 | | | 1 |
| sample 47 | 100 | 6 | | | | 0.3 | | | 2 |
| sample 48 | 100 | 10 | | | | 0.6 | | | 3 |
| sample 49 | 100 | | 1 | | | 1 | | | 1 |
| sample 50 | 100 | | 6 | | | 3 | | | 2 |
| sample 51 | 100 | | 10 | | | 6 | | | 3 |
| sample 52 | 100 | | | 1 | | 0.1 | | | 1 |
| sample 53 | 100 | | | 6 | | 0.3 | | | 2 |
| sample 54 | 100 | | | 10 | | 0.6 | | | 3 |
| sample 55 | 100 | | | | 1 | | | 0.1 | 1 |
| sample 56 | 100 | | | | 6 | | | 0.3 | 2 |
| sample 57 | 100 | | | | 10 | | | 0.6 | 3 |

Plasticine-like, tape-like, and self-fusion performances, and adhesive strengths with a copper substrate of the samples were evaluated according to same methods as described above for samples 1-15. All of samples 46-57 achieved comparable desired results.

Further tests were carried out for cured pads obtained from these samples, including:

Breakdown Voltage: according to GB J507-2002

Fire retardant performance: according to UL-94

UV aging performance: according to GB J1865-1997, 2000 h

Thermal aging performance: The cured pad was subjected to thermal aging in a 120° C. oven for 2000 h. Then the aged pad's breakdown voltage was tested. The breakdown voltage of more than 20 kV·mm⁻¹ was referred to as passing the thermal aging test.

The test results were summarized in the following table 8.

TABLE 8

Performances of the cured pad with different crosslinker and catalyst

| | adhesive strength with copper/ N · cm⁻¹ | adhesive strength with aluminum/ N · cm⁻¹ | breakdown Voltage/ kV · mm⁻¹ | fire retardance | UV aging | thermal aging/ 120° C. |
|---|---|---|---|---|---|---|
| sample 46 | N/A | N/A | 20~40 | V0 | >2000 h | >2000 h |
| sample 47 | N/A | N/A | 20~40 | V0 | >2000 h | >2000 h |
| sample 48 | N/A | N/A | 20~40 | V0 | >2000 h | >2000 h |
| sample 49 | >30, pad break | >30, pad break | 20~40 | V0 | >2000 h | >2000 h |
| sample 50 | >30, pad break | >30, pad break | 20~40 | V0 | >2000 h | >2000 h |

TABLE 8-continued

Performances of the cured pad with different crosslinker and catalyst

|  | adhesive strength with copper/ N · cm$^{-1}$ | adhesive strength with aluminum/ N · cm$^{-1}$ | breakdown Voltage/ kV · mm$^{-1}$ | fire retardance | UV aging | thermal aging/ 120° C. |
| --- | --- | --- | --- | --- | --- | --- |
| sample 51 | >30, pad break | >30, pad break | 20~40 | V0 | >2000 h | >2000 h |
| sample 52 | N/A | N/A | 20~40 | V0 | >2000 h | >2000 h |
| sample 53 | N/A | N/A | 20~40 | V0 | >2000 h | >2000 h |
| sample 54 | N/A | N/A | 20~40 | V0 | >2000 h | >2000 h |
| sample 55 | N/A | N/A | 20~40 | V0 | >2000 h | >2000 h |
| sample 56 | N/A | N/A | 20~40 | V0 | >2000 h | >2000 h |
| sample 57 | N/A | N/A | 20~40 | V0 | >2000 h | >2000 h |

Note:
"N/A" means that the adhesive strength of cured pads cannot be test accurately because of too quick curing speed.

From table 8 it can be seen that cured pads obtained from samples 49-51 with crosslinker D20 and catalyst D62 had better performances in connection with curing speed. Other crosslinkers and catalysts were also useful despite that they cure too rapidly when exposed to ambient environment, which will cause a bit trouble when applying.

Tests of Representative Samples

Adhesive strength with copper and aluminum, breakdown voltage, fire retardance, UV aging and thermal aging performance should be considered for the application of the pads. As such, cured pads obtained from other samples were also tested for these properties. The test results of some representative samples were summarized in the following table 9.

TABLE 9

Functional performance of the cured pads

|  | adhesive strength with copper/ N · cm$^{-1}$ | adhesive strength with aluminum/ N · cm$^{-1}$ | breakdown Voltage/ kV · mm$^{-1}$ | fire retardance | UV aging | thermal aging/ 120° C. |
| --- | --- | --- | --- | --- | --- | --- |
| sample 2 | >30, pad break | >30, pad break | 20~40 | V0 | >2000 h | >2000 h |
| sample 8 | >30, pad break | >30, pad break | 20~40 | V1~V0 | >2000 h | >2000 h |
| sample 18 | >30, pad break | >30, pad break | 20~40 | V1~V0 | >2000 h | >2000 h |
| sample 22 | >30, pad break | >30, pad break | 20~40 | V1~V0 | >2000 h | >2000 h |
| sample 28 | >30, pad break | >30, pad break | 20~40 | V1~V0 | >2000 h | >2000 h |
| sample 34 | >30, pad break | >30, pad break | 20~40 | V1~V0 | >2000 h | >2000 h |
| sample 44 | >30, pad break | >30, pad break | 20~40 | V1~V0 | >2000 h | >2000 h |

UV aging >2000 h and thermal aging >2000 h means that the adhesive strength, breakdown voltage and fire retardant are not reduced apparently and don't influence the application of this product after aging.

From table 9 it can be seen that RTV/butyl rubber based pads can be obtained with advantageous performances including good UV aging and thermal aging properties (more than 2000 h), high breakdown voltage (more than 20 kV·mm$^{-1}$), and good fire retardance performance (between V1 and V0), and adequate adhesive strength with copper and aluminum (more than 30 N/cm). Without further description, it is believed that one of ordinary skill in the art can, by using the preceding description and the above illustrative examples, make and utilize the compositions of the present invention and practice the claimed methods.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

The invention claimed is:

1. A curable composition, comprising a room temperature vulcanizable (RTV) silicone and at least one of an uncrosslinked rubber, a partially crosslinked rubber and an elastomer providing initial strength to the composition, wherein the ratio of the RTV silicone to the at least one of an uncrosslinked rubber, a partially crosslinked rubber and an elastomer ranges from 1:2 to 15:1 by weight.

2. The composition according to claim 1, wherein the RTV silicone has a Mn of from 10,000 g/mol to 3,000,000 g/mol.

3. The composition according to claim 1, wherein the RTV silicone has a viscosity of 10,000 cps or more.

4. The composition according to claim 1, wherein the RTV silicone comprises at least one selected from the group consisting of a hydroxyl silicone resin, an alkoxyl silicone resin, and a combination thereof.

5. The composition according to claim 4, wherein the alkoxyl silicone resin comprises at least one selected from the group consisting of methoxyl silicone resin, ethoxyl silicone resin, and a combination thereof.

6. The composition according to claim 1, wherein the at least one of an uncrosslinked rubber, a partially crosslinked rubber and an elastomer has a Mooney viscosity of at least 10 at 100° C.

7. The composition according to claim 1, wherein the at least one of an uncrosslinked rubber, a partially crosslinked rubber and an elastomer comprises at least one selected from the group consisting of butyl rubber, fluoroelastomer (FKM), ethylene propylene diene rubber (EPDM), ethylene propylene rubber (EPR), nitrile rubber (NBR), hydrogenated nitrile rubber (HNBR), acrylate rubber (ACM), polyurethane rubber (PUR), natural rubber (NR), styrene butadiene rubber (SBR), polychloroprene rubber (CR), polybutadiene rubber (BR), polyisoprene rubber (IR), chlorosulfonated polyethylene (CSM), polysulfide rubber (PSR), chlorohydrin rubber (CO), and the combination thereof.

8. The composition according to claim 1, wherein the at least one of an uncrosslinked rubber, a partially crosslinked rubber and an elastomer comprises at least one selected from the group consisting of butyl rubber, fluoroelastomer (FKM), hydrogenated nitrile rubber (HNBR), ethylene propylene diene rubber (EPDM), and the combination thereof.

9. The composition according to claim 1, wherein the ratio of RTV silicone to the rubber and/or elastomer ranges from 1:1.5 to 10:1 by weight.

10. The composition according to claim 1, further comprising at least one component selected from the group consisting of a crosslinker, a catalyst, a co-crosslinker, a reinforcing material, an adhesive promoter, a pigment, a toner, a fire retardant, a surface modifier, a thickener, a rheology modifier, and a combination thereof.

11. The composition according to claim 10, wherein the crosslinker comprises at least one selected from the group consisting of methyltriacetoxysilane, methyltrimethoxysilane, methyl tri(isopropenyloxy) silane, methyltrimethylethylketoximesilane, vinyltrimethoxysilane, vinyltriethoxysilane, γ-(methacryloxy)propyltrimethoxysilane, aminopropyltriethoxysilane, N-(β-aminoethyl)-γ-aminopropyltrimethoxysilane, γ-(2,3-epoxypropoxy)propyltrimethoxysilane, γ-mercaptopropyltriethoxysilane, γ-mercaptopropyltrimethoxysilane, methyltriethoxysilane, tetramethoxysilane, tetrapropoxysilane, tetraethoxysilane, and ethyltriacetoxysilane.

12. The composition according to claim 10, wherein the catalyst comprises at least one selected from the group consisting of titanium complex, dibutyltin diacetate, (tetramethylguanidino) propyl triethoxy silane, dibutyltin dilaurate, and stannous octoate.

13. The composition according to claim 10, wherein the reinforcing material comprises at least one selected from the group consisting of fumed silica, calcium carbonate, titanium oxide, mica and a combination thereof.

14. The composition according to claim 1, further comprising at least one component selected from the group consisting of γ-(2,3-epoxypropoxy) propyl trimethoxysilane, carbon black, DecaBDE, and antimony trioxide.

15. The composition according to claim 1, wherein the RTV silicone is from 20 wt % to 50 wt %, based on the total weight of the composition.

16. The composition according to claim 1, wherein the at least one of the uncrosslinked rubber, the partially crosslinked rubber and the elastomer is from 5 wt % to 40 wt %, based on the total weight of the composition.

17. The composition according to claim 10, wherein the amount of the crosslinker is from 0.1% to 20% by weight based on the amount of RTV silicone.

18. The composition according to claim 10, wherein the amount of the catalyst is from 0.5% to 10% by weight based on the amount of RTV silicone.

19. The composition according to claim 10, wherein the amount of the reinforcing material is from 10% to 300% by weight based on the amount of RTV silicone.

* * * * *

UNITED STATES PATENT AND TRADEMARK OFFICE
CERTIFICATE OF CORRECTION

PATENT NO. : 9,809,708 B2  
APPLICATION NO. : 15/303885  
DATED : November 7, 2017  
INVENTOR(S) : Yaming Wang It is certified that error appears in the above-identified patent and that said Letters Patent is hereby corrected as shown below:

In the Specification

Column 16,
Line 41, delete "GB J507-2002" and insert in place thereof -- GB\T507-2002 --.
Line 43, delete "GB J1865-1997" and insert in place thereof -- GB\T1865-1997 --.

Signed and Sealed this
Twenty-second Day of May, 2018

Andrei Iancu
*Director of the United States Patent and Trademark Office*